United States Patent [19]

Hangai et al.

[11] Patent Number: 4,977,554
[45] Date of Patent: Dec. 11, 1990

[54] SLIDER-POSITION DETECTOR FOR DETECTING THE POSITION OF THE SLIDER OF A DISK PLAYER

[75] Inventors: Toshimasa Hangai; Koichi Ishitoya; Akihiko Tagawa, all of Tokorozawa, Japan

[73] Assignee: Pioneer Electronic Corporation, Tokyo, Japan

[21] Appl. No.: 410,310

[22] Filed: Sep. 21, 1989

[30] Foreign Application Priority Data

Feb. 20, 1989 [JP] Japan .................................... 1-41366

[51] Int. Cl.$^5$ ............................................. G11B 17/30
[52] U.S. Cl. ...................................... 369/215; 369/32; 369/219; 369/244
[58] Field of Search ................... 369/215, 33, 216, 32, 369/219, 244

[56] References Cited

U.S. PATENT DOCUMENTS

| 4,527,265 | 7/1985 | d'Alayer de Costemore d'Arc . |
| 4,574,372 | 3/1986 | d'Alayer de Costemore d'Arc . |
| 4,613,962 | 9/1986 | Inoue et al. . |
| 4,644,514 | 2/1987 | Ohshima et al. ........................ 369/33 |
| 4,664,218 | 5/1987 | Graham et al. . |
| 4,697,256 | 9/1987 | Shinkai .................................. 369/33 |
| 4,706,234 | 11/1987 | Okada . |
| 4,764,911 | 8/1988 | Morota et al. ......................... 369/33 |

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

A slider-position detector for a disk player having a slider carrying a pickup and capable of moving in radial direction of a disk. The slider-position detector comprises an up-down counter which indicates a count variable according to the direction and moved distance of the slider, and controller which provides the count counted by the up-down counter as position data. The controller sets the up-down counter to a predetermined value when the counting rate of the up-down counter lowers below a predetermined rate while the slider moves in the predetermined direction. The slider-position detector is capable of surely detecting the position of the slider.

20 Claims, 4 Drawing Sheets

SLIDER-POSITION DETECTOR FOR DETECTING THE POSITION OF THE SLIDER OF A DISK PLAYER

BACKGROUND OF THE INVENTION

1. Field of the Invention

The present invention relates to a slider-position detector for detecting the position of the slider of a disk player.

2. Description of the Prior Art

In a disk player for playing an information recording disk (hereinafter referred to simply as "disk") such as a video disk, a digital audio disk, etc., a slider carrying a pickup is linearly moved in the radial direction of a disk. The slider is driven by a rotary motor through a mechanical transmission. A rack-and-pinion mechanism, for example, reduces the speed of the rotary motion of the rotary motor and converts the rotary motion into a linear motion to drive the slider for a linear motion.

The speed of the searching operation of the slider with the pickup, namely, an operation for searching a disk for a desired recording track while moving the slider at a high speed, is restricted since the response speeds of the mechanical transmission and the rotary motor are limited. Nevertheless, increase in the speed of the searching operation has been strongly desired in the industry. The speed of the searching operation of the slider may be increased by using a linear motor which has excellent response characteristics, instead of a rotary motor, as a driving source for driving the slider for a linear motion.

Incidentally, the position of the slider in the disk player must be detected to find the position of the pickup relative to the disk. Conventional means for detecting the position of the slider comprises a plurality of mechanical switches disposed in a row near the path of the slider at positions corresponding to the positions of the slider to be detected. The position of the slider is detected by the mechanical switches with which the slider comes into contact.

However, the use of the plurality of mechanical switches increases the manufacturing cost of the disk player. Particularly, the plurality of mechanical switches increase the load on the slider in the employment of a linear motor as a driving source for driving the slider. The use of the mechanical switches is unwanted.

SUMMARY OF THE INVENTION

Accordingly, an object of the present invention is to provide a slider-position detector for detecting the position of a slider, capable of accurately detecting the position of the slider.

The slider-position detector according to the present invention is incorporated in a disk player which has a pickup for reading information recorded in a recording disk, a slider carrying the pickup and capable of moving linearly in a radial direction of the disk, and driving means for moving the slider. The slider-position detector comprises: an up-down counter which indicates a value of the number of counts variable according to directions of movement and a moved distance of the slider; and control means for controlling the driving means and the up-down counter, wherein the control means causes the driving means to move the slider in a predetermined direction, and causes the up-down counter to up-count or down-count in accordance with the predetermined direction of the slider, wherein the control means further sets the up-down counter to a predetermined value when a counting rate of the up-down counter lowers below a predetermined rate during movement in the predetermined direction of the slider.

Namely, in the slider-position detector according to the present invention, the up-down counter counts the number of pulse signals whose value is variable according to the moving direction and moved distance of the slider and outputs the value as position data to the control means, and furthermore the up-down counter is controlled by the control means so as to adjust the value of the number of counts counted by the up-down counter to the predetermined value at a moment when the counting rate of the up-down counter is lowered below the predetermined rate.

DETAILED DESCRIPTION OF THE PREFERRED EMBODIMENT

The embodiment according to the present invention will be explained referring to the accompanying drawings in detail.

Figure 1:
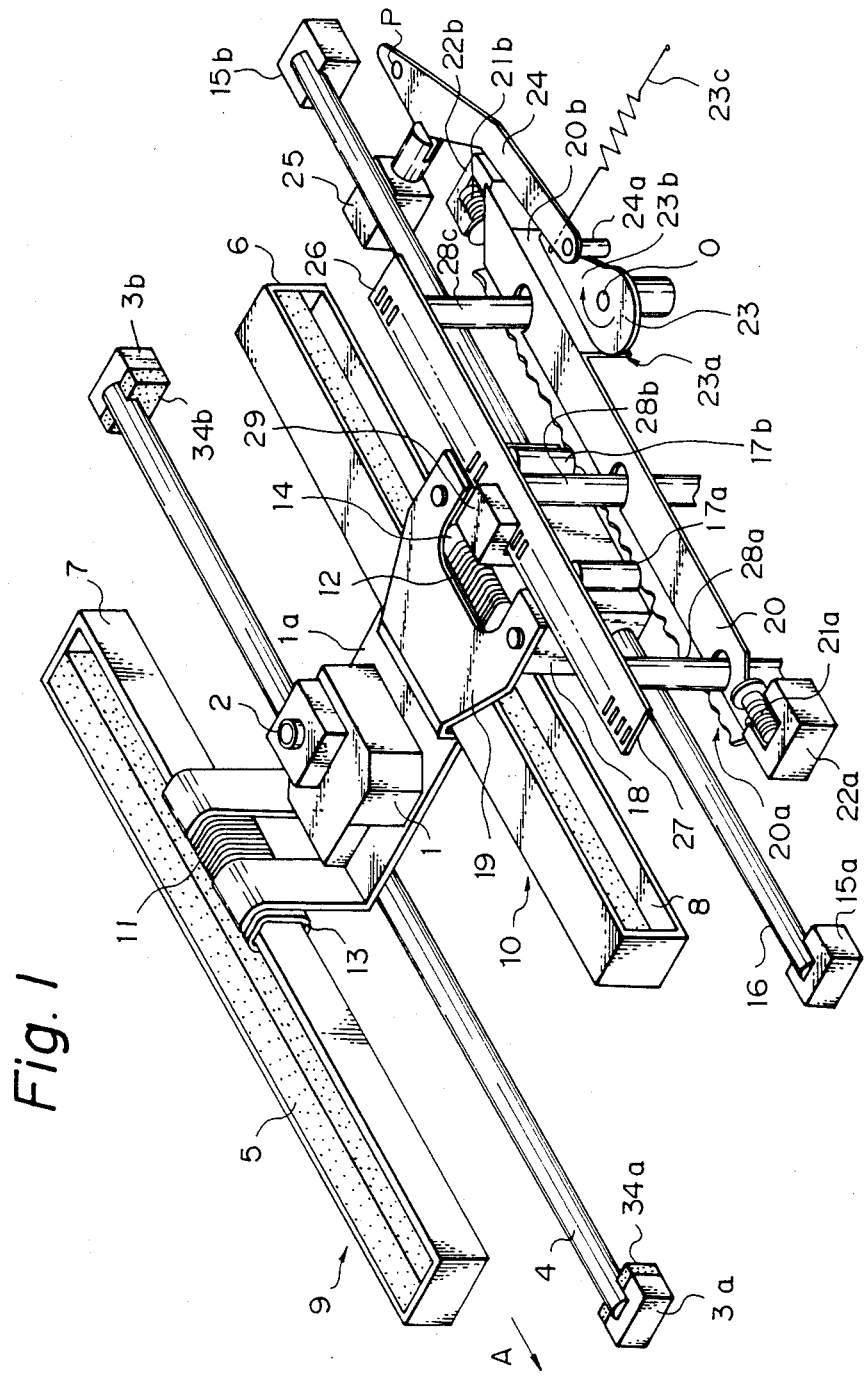
FIG. 1 is a perspective view of a slider driving mechanism incorporating a slider-position detector for detecting the position of the slider of a disk player in a preferred embodiment according to the present invention.

FIG. 1 shows a slider driving mechanism incorporating a slider-position detector for detecting the position of the slider of a disk player. The slider 1 carries an optical pickup 2 for reading information recorded in a disk, not shown. The slider 1 is guided by a straight guide rail 4 for a linear movement between the opposite ends of the guide rail 4. The slider 1 has extensions or wings 1a laterally extending perpendicularly to the guide rail 4 on the opposite sides of the rail. Cushion members 34a and 24b are attached to the respective inner surfaces of stoppers 3a and 3b to absorb the energy of collision of the slider 1 against the stoppers 3a and 3b. A pair of elongate magnetic circuits 9 and 10 are extended in parallel to the guide rail 4, respectively, on the opposite sides of the guide rail 4. The magnetic circuits 9 and 10 comprise, respectively, magnets 5 and 6 having the shape of a rectangular prism, and elongate yokes 7 and 8 having the shape of a rectangular frame. The yokes are combined, respectively, with the magnets 5 and 6 so as to form magnetic gaps in combination with the side surfaces of the corresponding magnets 5 and 6. Coil holders 13 and 14 are lapped around the respective sides of the yokes 7 and 8 so as to be movable along the sides respectively. Coils 11 and 12 are wound on the coil holders 13 and 14 respectively. The coil holders 13 and 14 carrying the coils 11 and 12 are fixed to the extensions 1a of the slider 1 respectively. Therefore, the slider 1 moves together with the coils 11 and 12. The slider 1 is driven directly for movement along the guide rail 4 by supplying predetermined driving currents to the coils 11 and 12 from a motor driving circuit, not shown. Thus, the magnetic circuits 9 and 10, and the coils 11 and 12 constitute a moving-coil linear motor.

A straight guide rail 16 is extended on the outside of the magnetic circuit 10 in parallel to the guide rail 4. The guide rail 16 is held at the opposite ends thereof on stoppers 15a and 15b. A rectangular moving block 18 has a pair of protrusions 17a and 17b on the outer surface thereof. The moving block 18 is slidably mounted on the guide rail 16 for sliding movement along the guide rail 16. A connecting arm 19 extending outward from the extension 1a of the slider 1 is fixed to the upper surface of the moving block 18 to move the moving block 18 together with the slider 1. An elongate locking plate 20 having a cross section resembling the letter "L" is extended in parallel to the guide rail 16. Teeth 20a are formed throughout at the upper edge of the upward portion of the locking plate 20 corresponding to the arm of "L". A lug 20b projects downward from the lateral portion of the locking plate 20 corresponding to the stem of "L". Pivots 21a and 21b longitudinally extending from the opposite ends of the locking plate 20 are supported rotatably in bearings 22a and 22b respectively. A cam 23 having a cam surface 23a and a nose 23b is supported for turning about an axis of rotation "O". The cam 23 is urged in the direction of an arrow, i.e., a clockwise direction, by urging means 23c. The cam surface 23a of a curve consisting of points continuously varying in distance from the axis of rotation "O" engages the outer surface of the lug 20b of the locking plate 20. The cam 23 is turned in the direction of the arrow to turn the locking plate 20 by pushing the lug 20b. A pin 24a provided on one end of a swing arm 24 engages the nose 23b of the cam 23. The swing arm 24 is caused to swing on a pivot "P" provided at the other end thereof by an actuator 25 engaging the swing arm 24 at a position between the pin 24a and the pivot "P". When the actuator 25 makes swing arm 24 swing on the pivot "P" in a clockwise direction, the pin 24a pushes the nose 23b of the cam 23 to turn the cam 23 in a counterclockwise direction. When the actuator 25 makes the swing arm 24 swing on the pivot "P" in a counterclockwise direction, the cam 23 is allowed to turn in a clockwise direction with the nose 23b following the pin 24a. The operating member of the actuator 25 is retracted while the disk player is connected to a power supply. The above components constitute a slider locking mechanism for locking the slider 1 at a selected position.

A shading plate 27 having a plurality of slits 26 in an optically identifiable pattern is extended in parallel to the guide rail 16 and is supported fixedly by three supports 28a, 28b and 28c on a chassis, not shown. A sensor 29 comprises a photocoupler having a light emitting element and a light-sensitive elements. The sensor 29 is fixed to the upper surface of the moving block 18 so that the shading plate 27 is disposed with gaps between the light emitting element and the light-sensitive element which receives lights passing through the slits 26 emitted from the light emitting element. The sensor 29 moves together with the slider 1 and generates a single pulse signal per one detection of each slit 26. The shading plate 27 and the sensor 29 constitute a pulse signal generating means which generates a pulse signal every time the slider 1 is moved through a predetermined distance, namely, a distance corresponding to the pitch of the slits 26.

Figure 2:
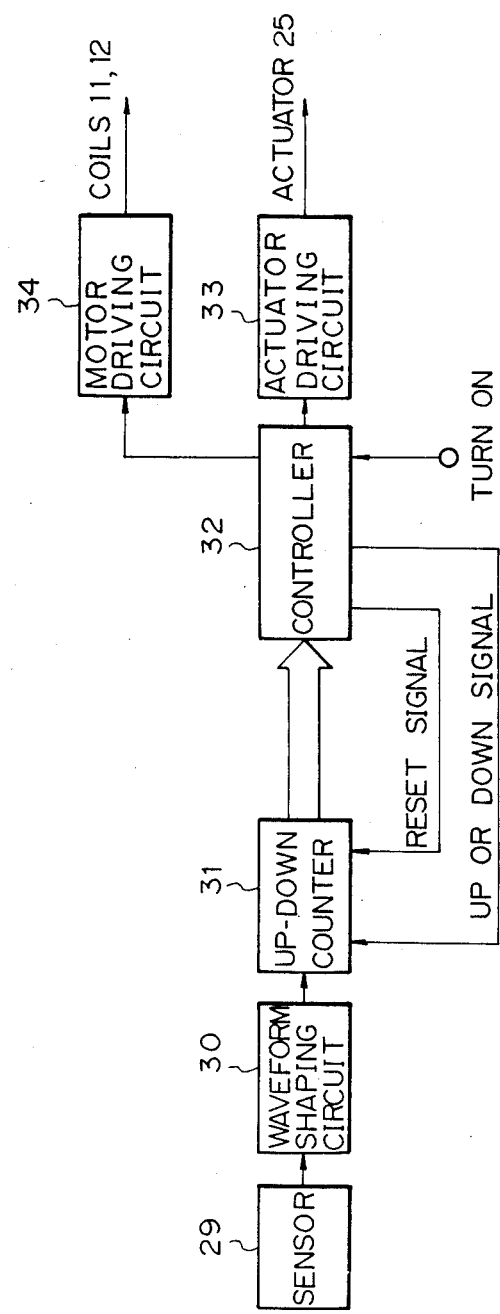
FIG. 2 is a block diagram of a control circuit for controlling the slider driving mechanism.

Referring to FIG. 2, pulse signals generated by the sensor 29 are provided to an up-down counter 31 after shaping the waveform thereof by a waveform shaping circuit 30. The up-down counter 31 counts the pulse signals and gives a value of the number of counts of the pulse signals i.e. a count value to a controller 32 as position data representing the position of the slider 1.

The controller 32 comprises a microcomputer. When the slider 1 arrives at a predetermined position such as an initial position of the disk, the controller 32 gives a reset signal to the up-down counter 31 to reset the count value of the up-down counter 31. The controller 32 then gives an up-signal or a down-signal to the up-down counter 31 according to the direction of movement of the pickup 2, namely, the normal direction or the reverse direction, in accordance with the operating mode of the disk player such as a lead-in mode, a lead-out mode, a play mode, a search mode or a scan mode. For example, the controller 32 can control the up-down counter 31 so either as to up-count correspondingly to the radially outward movement of the pickup 2 or as to down-count correspondingly to the radial inward movement of the same. The controller 32 obtains the count value counted by the up-down counter 31 and gives the count value as the position data of the pickup 2 of the slider 1 to an external circuit if necessary.

The controller 32 further controls an actuator driving circuit 33 for driving the actuator 25, and a motor driving circuit 34 for supplying currents to the coils 11 and 12 to control the slider 1. Namely, the controller 32 provides an ON or OFF signal to the actuator driving circuit 33 and the motor driving circuit 34.

Figure 3:
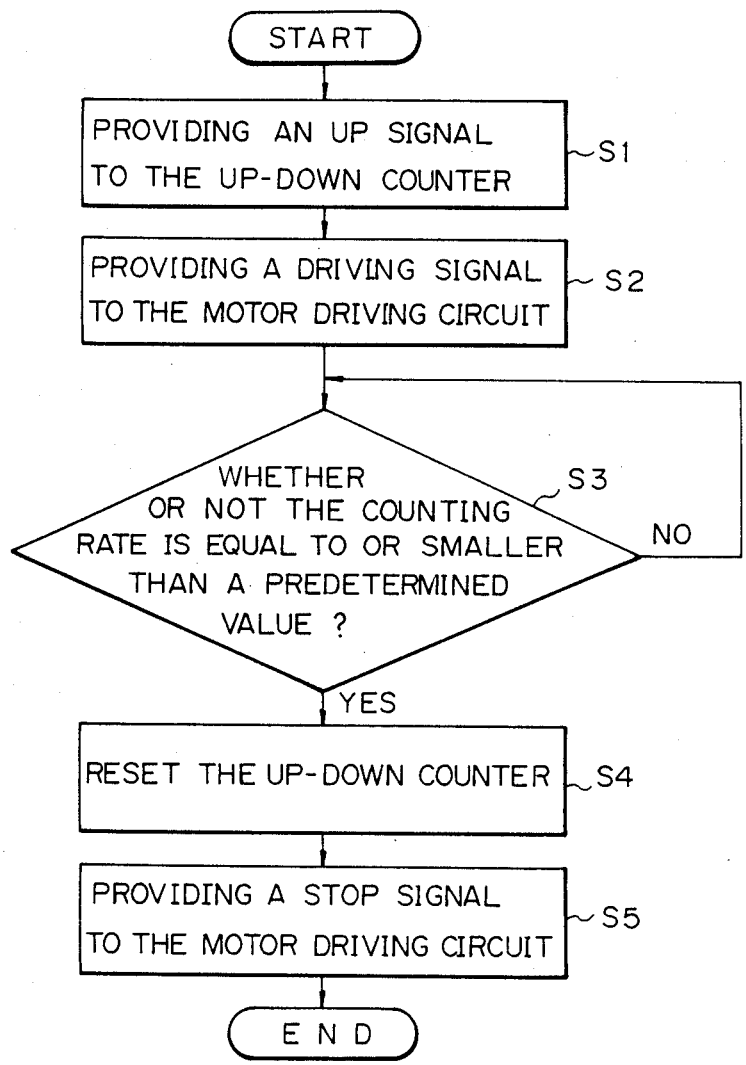
FIG. 3 is a flow chart of a procedure for resetting an up-down counter.

Steps of a resetting procedure to be executed by the microprocessor of the controller 32 to reset the up-down counter 31 will be described hereinafter with reference to a flow chart shown in FIG. 3. This resetting procedure is executed when the disk player is started or when necessary. In FIG. 1, a direction indicated by an arrow "A" corresponds to a radially inward direction of the disk.

In step S1, the controller 32, first, provides the up-count signal to the up-down counter 31. In the step S2, the controller 32 gives the ON signal to the motor driving circuit 34 to drive the linear motor comprising the magnetic circuits 9 and 10 and the coils 11 and 12 to move the slider 1 in the direction of the arrow "A" while monitoring a counting rate, namely the number of counts of the pulse signals per a unit time, counted by the up-down counter 31 during the movement of the slider 1. In step S3, the controller 32 determines whether or not the counting rate is equal to or smaller than a predetermined value. When the response in step S2 is affirmative, it is determined that the slider 1 has reached an inner most position, namely, a position where the slider is in abutment with the stopper 3a, at the same time, the controller 32 resets the up-down counter 31 in step S4. In the step 5, the controller 32 provides the OFF signal to the motor driving circuit 34. After this resetting procedure, the absolute position "x" of the slider 1 is defined by $$x = L + N \cdot D$$

where "N" is a value of the number of counts counted by the up-down counter 31, "L" is the absolute starting position of the stopper 3a, and "D" is the width of the slits 26.

In this embodiment, the cushion 34a is attached to the inner surface of the stopper 3a to absorb shocks applied by the slider 1 to the stopper 3a. The cushion 34a rebounds the slider 1 resiliently, and hence the slider is unable to stop perfectly in contact with the cushion 34a of the stopper 3a. Accordingly, it is determined that the slider 1 has stopped, when the counting rate of the counter 31, i.e. the change rate of the count value counted by the counter 31 per a unit time becomes smaller than the predetermined rate. The slider 1 can be brought to a substantially perfect stop in firm contact with the cushion 34a by controlling the motor driving circuit 34. In other words, the controller 32 causes the motor driving circuit 34 to increase the driving currents supplied to the coils 11 and 12 of the linear motor for driving the slider 1 to press the slider 1 against the cushion 34a for a predetermined time period after the counting rate has lowered below the predetermined value.

Thus, the pulse signals each generated every time the slider 1 is moved through a predetermined distance are counted by the up-down counter 31 while the slider 1 is moving in a direction, namely, the radially inward direction in this embodiment. The up-down counter 31 is reset when the counting rate of the up-down counter 3 lowers below the predetermined value. A position occupied by the slider 1 when the up-down counter 31 is reset is assumed to be a reference or starting position. After the slider 1 has started from the reference position, the absolute position of the slider 1 is determined with reference to the reference position in such a manner that the up-down counter counts the pulse signals of the sensor 29. The count value of the number of counts, namely the number of pulse signals counted by the up-down counter, represents position data indicating the absolute position of the slider 1 relative to the reference position. Thus, the slider-position detector of the present invention is able to detect the position of the slider 1 without using any mechanical switch.

The controller 32 further controls the driving circuit 33 to energize the actuator 25 of the slider locking mechanism so as to hold the plunger of the actuator 25 in a retracted position, when the power supply of the disk player is turned on. While the disk player is in a stop mode, the controller 32 monitors the count value counted by the up-down counter 31. If the count value exceeds a predetermined value, the controller 32 determines that the slider 1 which must be stationary is moved by an external disturbance such as external vibrations, and controls the driving circuit 33 to project the plunger of the actuator 25 by way of the non-energized state.

Figure 4:
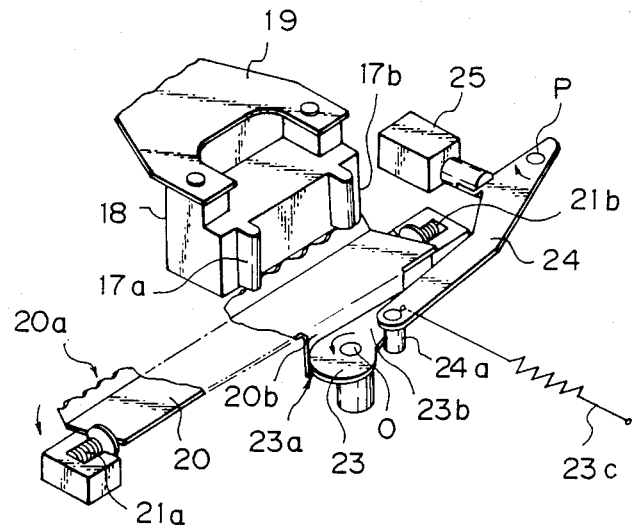
FIG. 4 is a perspective view of a slider locking mechanism is a releasing state.
Figure 5:
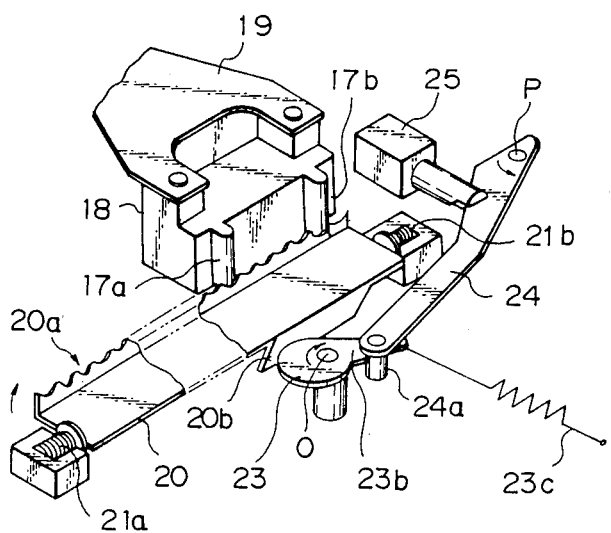
FIG. 5 is a perspective view of the slider locking mechanism of FIG. 4 in a locking state.

Functions of the slider locking mechanism will be described hereinafter with reference to FIG. 4 and 5 showing the slider locking mechanism, respectively, in a releasing state and in a locking state.

FIG. 4 shows that the plunger of the actuator 25 is energized and retracted while the disk player is connected to the power supply in the turned on state. This state is usually in a stop mode in which the disk player waits any commands. The plunger of the actuator 25 has turned the swing arm 24 clockwise to turn the cam 23 counterclockwise against a counter-force of the urging means 23c for urging the cam 23 clockwise. In this state, the lowest portion of the cam surface 23a of the cam 23 corresponding to a portion of the base circle of the cam 23 is in contact with the lug 20b of the locking plate 20, and hence the locking plate 20 is titled counterclockwise on the pivots 21a and 21b because the upward portion of the locking plate 20 is heavier than the lug 20b. As a result, the teeth 20a of the locking plate 20 goes down and are separated from the protrusions 17a and 17b of the moving block 18 to allow the free movement of the moving block 18. In this state, the slider 1 is released from the locking mechanism.

On the other hand, the controller 32 controls the driving circuit 33 to project the plunger of the actuator 25, only when the controller 32 detects the displacement of the slider 1 on the basis of the output signal of the sensor 29 even while the disk player is in the stop mode, in which the slider 1 must not be driven by the controller in the released state. Consequently, the actuator 25 turns the swing arm 24 counterclockwise, and then the swing arm 12 allows the urging means 23c to turn the cam 23 clockwise as shown in FIG. 5. In this state, the highest portion of the cam surface 23a of the cam 23 engages and pushes the lug 20b of the locking plate 20 to turn the locking plate 20 clockwise. Consequently, the teeth 20a of the locking plate 20 rise and engage the protrusions 17a and 17b of the moving block 18 to lock the moving block 18, hence the slider 1 is fixedly connected to the moving block 18 in the locking state.

When the mode of the disk player is changed from the stop mode to other mode, the controller 32 controls the driving circuit 33 to release the slider 1 from the slider locking mechanism by retracting the plunger of the actuator 25. On the other hand, while the disk player is disconnected from the power supply in the turn off state, the slider locking mechanism remains automatically in the locking state because no current is supplied to the actuator 25.

Thus, the disk player according to the present invention employs the slider 1 driven by the linear motor which is liable to be moved accidentally because the friction coefficient is low. Such disk player is apt to suffer from an unwanted interference of an external vibrations and then the slider 1 is moved. Therefore, the position of the slider 1 is monitored even in the stop mode and the slider 1 is locked upon the detection of the displacement of the slider 1. Accordingly, the slider 1 will not be moved significantly in the stop mode, even if an external disturbance such as external vibrations acts on the disk player. As a result, the mode of the disk player can be smoothly changed from the stop mode to other mode. Furthermore, the disk player is usually put on a stationary place, the locking mechanism is therefore actuated to lock the slider 1 only when the slider 1 is moved accidentally. As a result, the repetition of the locking operation of the slider locking mechanism is restricted to the least necessary number of times. The disk player according to the present invention reduces the frequency of generation of unpleasant noises generated when the slider locking mechanism is operated within the least necessary extent. The life of the slider locking mechanism is therefore extended.

In this way, the slider locking mechanism of the foregoing embodiment is actuated to lock the slider 1 only when the slider 1 is moved while the disk player is in the stop mode, although the slider locking mechanism may be actuated usually. In this case, the frequency of generation of the operating noises is increased, every time the disk player is set in the stop mode.

The foregoing embodiment employs the pulse signal generating means which comprises the shading plate 27 provided with the slits 26, and the photoelectric sensor 29 as means for generating a pulse signal every time the slider 1 is moved through a predetermined distance corresponding to the pitch of the slits 26 of the shading plate 27. However, the pulse signal generating means is not limited thereto. The disk player may employs any suitable means capable of generating a pulse signal every time the slider 1 is moved through a predetermined distance.

In the foregoing embodiment, the counting rate of the up-down counter 31 is monitored while the slider 1 is moved in the predetermined direction, after that the up-down counter 31 is reset or the value thereof is set to zero when the counting rate of the up-down counter lowers below the predetermined value. However, upon the detection of the predetermined value, it is also possible to set the value of the up-down counter 31 to another predetermined value other than zero.

As is apparent from the foregoing description, the slider-position detector for detecting the position of the slider in accordance with the present invention provides the count value corresponding to the direction and moved distance of the slider carrying the pickup and capable of moving in radial directions of the disk counted by the up-down counter, and sets the up-down counter to a predetermined value when the counting rate of the up-down counter lowers below a predetermined value. Accordingly, the position of the slider can surely be detected without using any mechanical switch.

What is claimed is:

1. A slider-position detector mounted on a disk player which has a pickup for reading information recorded in a recording disk, a slider carrying said pickup and capable of moving linearly in a radial direction of said disk, stopping means for abutting and physically limiting movement of said slider in a predetermined direction, and driving means for moving said slider, said slider-position detector comprising:
    up-down counter means for providing a value in a number of counts varying according to distance and directions of movement of said slider; and
    control means for controlling said driving means and said up-down counter means, wherein said control means caused said driving means to move said slider in said predetermined direction, and causes said up-down counter means to up-count or down-count in accordance with said predetermined direction of said slider, said control means setting said up-down counter means to a predetermined value when said slider abuts said stopping means and when a counting rate of said up-down counter means decreases below a predetermined rate during movement in said predetermined direction of said slider.

2. A slider-position detector according to claim 1, wherein said control means resets said up-down counter or sets a value of the number of counts of said up-down counter to zero when the counting rate of said up-down counter lowers below the predetermined rate.

3. A slider-position detector according to claim 1, wherein said control means sets a value of the number of counts of said up-down counter to another predetermined value other than zero when the counting rate of said up-down counter lowers below the predetermined rate while said slider is moved in the predetermined direction.

4. A slider-position detector according to claim 1, further comprising pulse generating means including a plurality of marks arranged at a predetermined pitch along the path of said slider, and detecting means movable along said path for generating a pulse signal upon the passage thereof above each of said marks.

5. A slider-position detector according to claim 4, wherein said up-down counter up-counts or according to the pulse signals provided from said detecting means.

6. The slider-position detector of claim 1, wherein said control means sets a reference position of said slider when said control means sets said up-down counter to said predetermined value, said reference position being used to determine an absolute position of said slider when said slider is subsequently moved from said reference position.

7. The slider-position detector of claim 1, and further comprising means for determining the position of said stopping means and generating a signal representative thereof, and wherein said control means determines said absolute position by computing the summation of the signal representing the position of said stopping means and the distance travelled during the subsequent movement of said slider as determined by said up-down counter.

8. The slider-position detector of claim 7, and further comprising pulse generating means including a plurality of marks arranged at a predetermined pitch along the path of said slider, and detecting means movable along said path for generating a pulse signal upon the passage thereof above each of said marks, and wherein said control means determines the distance travelled during the subsequent movement of said slider by the product of the number of counts corresponding to the number of marks detected by said detecting means and counted by said up-down counter during the subsequent movement of said slider, and said predetermined pitch of said marks.

9. The slider-position detector of claim 1, wherein said control means controls said driving means to increase the speed of said slider as said slider approaches said stopping means for driving said slider to press against said stopping means for a predetermined period of time after said control means determines said counting rate is less than a predetermined rate in said predetermined direction of said slider, to bring said slider to a complete stop in firm contact with said stopping means.

10. The slider-position detector of claim 1, and further comprising a resilient cushion means attached to said stopping means for absorbing impact with said slider.

11. A slider-position detector mounted on a disk player which has a pickup for reading information recorded in a recording disk, a slider, a first guide rail for defining movement of said slider, said slider carrying said pickup and capable of moving linearly in a radial direction of said disk, driving means for moving said slider, and stopping means for abutting and physically limiting movement of said slider in a predetermined direction, said slider-position detector comprising:
    locking means for locking said slider in accordance with a locking signal, said locking means comprising:
        a second guide rail;
        a moving block slidably mounted on said second guide rail and connected to and movable with said slider, said moving block having engaging means on a surface thereof;

a locking plate disposed parallel to said second guide rail and having receiving means for receiving the engaging means of said moving block for preventing movement of said movement block relative to said locking plate, said locking plate being movable between a release position whereby said receiving means is disengaged from said engaging means of said moving block and a disengaged from said engaging means of said moving block and a locking position whereby said receiving means receive said engaging means;

biasing means for biasing said locking plate in said release position; and actuator means for forcing said locking plate to move to said locking position;

said slider-position detector further comprising up-down counter means for providing a value in a number of counts varying according to the distance and direction of movement of said slider; and control means for providing a locking signal to said locking means while said disk player is in a stop mode, and for controlling said driving means and said up-down counter means, wherein said control means causes said driving means to move said slider in said predetermined direction and causes said up-down counter means to up-count or down-count in accordance with said predetermined direction of said slider, said control means setting said up-down counter means to a predetermined value when said slider abuts said stopping means and when a counting rate of said up-down counter decrease below a predetermined rate during movement of said slider in said predetermined direction.

12. The slider-position detector of claim 11, wherein said control means sets a reference position of said slider when said control means sets said up-down counter means to said predetermined value, said reference position being used to determine an absolute position of said slider when said slider is subsequently moved from said reference position.

13. The slider-position detector of claim 11, and further comprising means for determining the position of said stopping means and generating a signal representative thereof, and wherein said control means determines said absolute position by computing the summation of the signal representing the position of said stopping means and the distance travelled during the subsequent movement of said slider as determined by said up-down counter means.

14. The slider-position detector of claim 11, and further comprising pulse generating means including a plurality of marks arranged at a predetermined pitch along the path of said slider, and detecting means movable along said path for generating a pulse signal upon the passage thereof above each of said marks, and wherein said control means determines the distance travelled during the subsequent movement of said slider by the product of the number of counts corresponding to the number of marks detected by said detecting means and counted by said up-down counter means during the subsequent movement of said slider, and said predetermined pitch of said marks.

15. The slider-position detector of claim 11, wherein said control means controls said driving means to increase the speed of said slider as said slider approaches said stopping means for driving said slider to press against said stopping means for a predetermined period of time after said control means determines said counting rate is less than a predetermined rate in said predetermined direction of said slider, to bring said slider to a complete stop in firm contact with said stopping means.

16. The slider-position detector of claim 11, and further comprising a resilient cushion means attached to said stopping means for absorbing impact with said slider.

17. The slider-position detector of claim 11, wherein said control means resets said up-down counter means or sets a value of the number of counts of said up-down counter means to zero when the counting rate of said up-down counter means decreases below said predetermined rate.

18. The slider-position detector of claim 11, wherein said control means sets a value of the number of counts of said up-down counter means to another predetermined value other than zero when the counting rate of said up-down counter means decreases below said predetermined rate while said slider is moved in the predetermined direction.

19. The slider-position detector of claim 11, and further comprising pulse generating means including a plurality of marks arranged at a predetermined pitch along the path of movement of said slider, and detecting means movable along said path for generating a pulse signal upon the passage thereof above each of said marks.

20. The slider-position detector of claim 19, wherein said up-down counter means up-counts or down-counts according to said pulse signals provided by said detecting means.

* * * * *